Nov. 25, 1969  H. D. SCHLETZ  3,480,259

PAINT MIXING APPARATUS

Filed July 1, 1968  2 Sheets-Sheet 1

INVENTOR
HOWARD D. SCHLETZ
BY *Stryker and Jacobsen*
ATTORNEYS

Nov. 25, 1969  H. D. SCHLETZ  3,480,259
PAINT MIXING APPARATUS
Filed July 1, 1968  2 Sheets-Sheet 2

INVENTOR
HOWARD D. SCHLETZ
BY Stryker and Jensen
ATTORNEYS

United States Patent Office 3,480,259
Patented Nov. 25, 1969

3,480,259
PAINT MIXING APPARATUS
Howard D. Schletz, 165 W. Logan,
West St. Paul, Minn. 55118
Filed July 1, 1968, Ser. No. 741,555
Int. Cl. B01f 11/00
U.S. Cl. 259—75                                    8 Claims

ABSTRACT OF THE DISCLOSURE

A paint mixing apparatus having members for holding a container of paint in the peripheral region during application of oscillatory motion to the container.

BACKGROUND OF THE INVENTION

Field of the invention

This invention relates generally to paint mixing apparatus and, more specifically, to nonmassive means for holding a paint container while shaking it about a nonvertical axis.

Apparatus for mixing paint within a container is useful if an operator desires to quickly remix an oil base paint in which the pigment has separated from the vehicle and settled to the bottom of the container or if an operator desires to mix a primary pigment paint color with a base paint. Generally, a manufacturer supplies retailers with a number of primary pigment paint colors, a base paint, a color chart, and instructions on the proportions of the primary pigment paint color necessary to mix with a base paint to produce a desired shade of paint. In order to mix the paint it is necessary for the retailer to have an apparatus for quickly and conveniently mixing the primary pigment color and the base paint.

Apparatus for mixing oil base paints within the containers is well known in the art. These paint mixers usually shake the container in an oscillatory manner about a vertical or horizontal axis thereby mixing the paint within the container. The mixing action within the container disperses the pigments throughout the paint, thus creating a homogeneous mixture of uniform color. The known shakers have been capable of quickly mixing the primary pigment colors with the oil base paint to produce a homogeneous mixture of uniform color. However, with the advent of latex paint it was discovered that the existing shakers would not mix the latex paints as quickly as the previous oil base paints. In some instances it takes ten times as long to mix the primary pigment paint color with a latex base paint compared to mixing the primary pigment paint color with an oil base paint. Generally, this is undesirable because after a customer purchases the paint he does not want to wait a long time while the paint is mixed. Furthermore, mixing the latex base paints in a shaker for an extended period of time produces air bubbles in the paint. Thus, not only would the customer have to wait while the paint was mixed, but he would also have to wait up to twenty-four hours to allow the air bubbles to disappear before the paint could be applied uniformly. If the latex base paints were only mixed a short time, to prevent formation of excess air bubbles, customers complained that the paint became streaked when it was applied which was due to insufficient mixing. Thus, there has been a need for a paint shaker that will quickly and effectively mix primary pigment paint colors with a latex base paint within a container.

I have discovered that by holding the container at the peripheral regions with a nonmassive holder and then oscillating the container about an axis approximately 15 degrees from a vertical produces a significant decrease in the time necessary to mix a latex paint. The exact nature and explanation of the shorter mixing time is not thoroughly understood but it is believed due to the special manner of holding the container or the oscillation of the container about a nonvertical axis or possibly both.

SUMMARY

Briefly, the invention comprises discovering that holding a paint container at the peripheral regions of the container with a nonmassive holder while oscillating the container about an axis approximately 15 degrees from the vertical rapidly mixes latex base paint.

BRIEF DESCRIPTION OF THE DRAWING

FIGS. 1 and 2 show a paint mixing apparatus 10 comprising a stand 11, a motor 12, a drive assembly 13 and a paint container holder 14.

Figure 1:
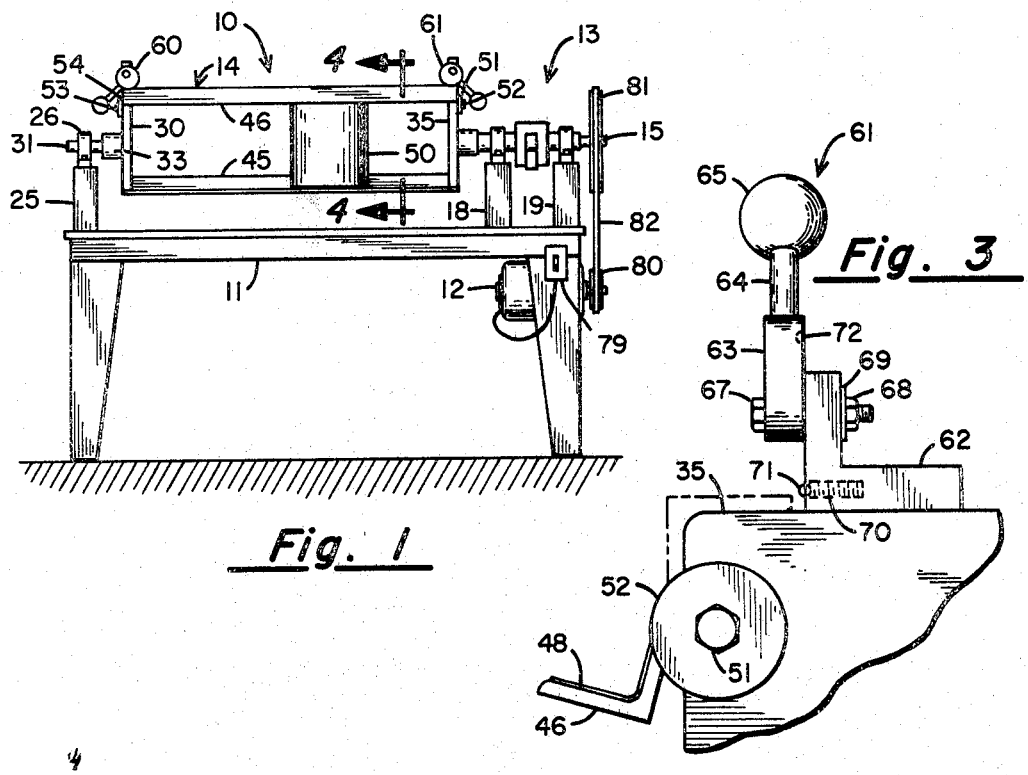
FIG. 1 is a front elevation view of my mixing apparatus showing the container clamping apparatus.

The drive assembly 13 comprises a rigid shaft 15 rotatably supported in a bearing 16 and a bearing 17 through a block 18 and a block 19 which are fastened to stand 11. Located between bearing 16 and bearing 17 is an eccentric drive 22 which is rigidly fastened to shaft 15.

Paint container holder 14 is rotatably supported in a bearing 23 and a bearing 24 which are fastened respectively to blocks 18 and 19 on the right side of the holder and a bearing 26 which is fastened to block 25. On the right side of holder 14, located between bearing 23 and bearing 24, is a yoke 28 which is rigidly fastened to a shaft 27 that connects to holder 14. Yoke 28 connects to eccentric 22 through an arm 29 which completes the drive assembly linkage.

Holder 14 comprises an end member 30 having a shaft 31 connected thereto through block 33 on the left side of the holder. Similarly, on the right side of the holder an end member 35 connects to shaft 27 through block 41.

Note, the geometric center of the holder does not correspond to an axis of rotation running through the center of shaft 27 and the center of shaft 31. Instead, for a gallon size container the geometric center of the holder is approximately ½ inch above the axis of rotation running through the center of shaft 31 and the center of shaft 27. For smaller or larger containers the geometric center of the holder would be correspondingly closer or farther from the axis of rotation running thrugh the center of shaft 27 and the center of shaft 31. By having the geometric center of the holder above the axis of rotation causes the center of mass of the paint within the container to be above the axis of rotation. This probably creates a net upward force on the paint thus aiding in mixing the paint.

Figure 4:
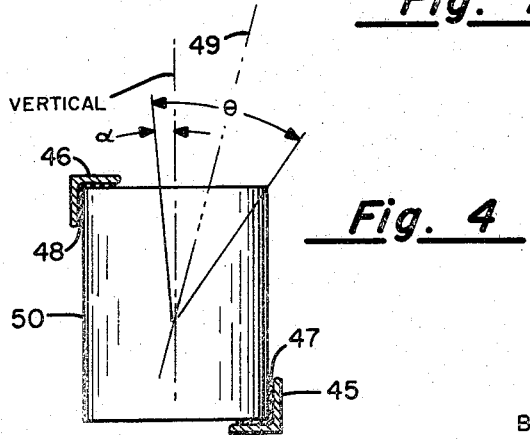
FIG. 4 is a cross-sectional view taken along lines 4—4 of FIG. 1 showing how the container is supported within the holder.

Attached to end members 30 and 35 is a lower angle bar aluminum support 45 and an upper angle bar support 46 which are shown in cross-section of FIG. 4. These angle bar supports are preferably made out of a material such as aluminum; however, other materials could be used but aluminum is preferred because of its light weight. Angle bar supports 45 and 46 rigidly clamp onto diagonally opposite peripheral regions of a container 50. Located on the inner surface of angle bar supports 45 and 46 is a neoprene cushion 47 and a neoprene cushion 48 which prevents container 50 from moving within the holder. The material need not be neoprene and could be a resilient substance such as cork or the like which would prevent slippage between container 50 and holder 14. However, neoprene rubber is preferable because of its imperviousness to most solvents used with various paints. The cushions also act as a compensator for small variations in the longitudinal dimensions of the container. That is, there is an ⅛ inch cushion on the lower support and an ⅛ inch cushion on the upper support which can compress to accommodate cans slightly oversized.

Figure 3:
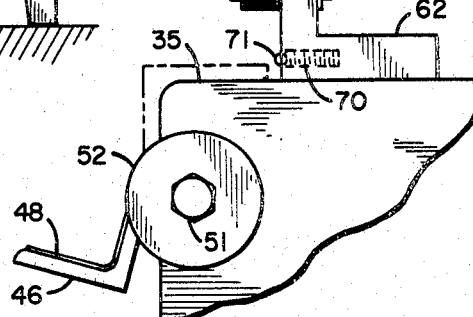
FIG. 3 shows a cam locking member for securing one end of the container holder.
Figure 2:
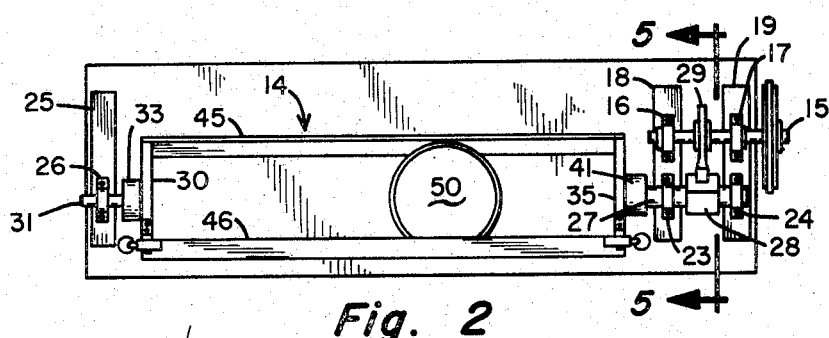
FIG. 2 is a top view of the mixing apparatus shown in FIG. 1.

Reference numeral 49 denotes the oscillation axis of the container which is approximately 15 degrees from a vertical axis. Referring to FIG. 1 and FIG. 3, one end of upper angle bar support 46 is rotatably mounted in end member 35 by a bolt 51 and a washer 52 and the other end of upper angle bar support 46 is rotatably mounted in end member 30 by a bolt 53 and a washer 54. Angle bar support 46 rotates to the position shown in solid lines in FIG. 3 to allow paint containers to be quickly placed in or removed from paint container holder 14. Although angle bar supports 45 and 46 are fastened to the end members so as to accommodate only one size can, it is apparent that one set of supports could be adjusted to hold various size containers.

To securely hold the paint container within holder 14 angle bar support 46 rotates to the position indicated by the dotted line in FIG. 3. In this position, two cam locks 60 and 61, securely hold the rotatable angle bar support 46 to the top surface of end members 30 and 35. Because both cam locks are identical, only cam lock 61 will be described herein. Cam lock 61 comprises a supporting bracket 62 attached to end member 35 through suitable fastening means (not shown); a circular member 63 having an offset center; a cylindrical shaft 64; and a round handle 65. Member 63 attaches to the holding bracket 62 through a bolt 67, a nut 68, and a washer 69. Because the hole in member 63 is eccentrically located, clockwise rotation of member 63 about the bolt 67 causes the member 63 to contact the top of angle bar support 46 when angle bar support 46 is in the position indicated by dotted lines in FIG. 3. In the normal use of the holder, the circular member 63 will repeatedly contact the top of support 46, thereby producing a certain amount of wear on the edge of member 63 and on the top of support 46. To minimize this wearing effect the surfaces can be hardened or a replaceable shim can be attached to the top of support 46. Then if after repeated use circular member 63 should not securely hold support 46 to end member 35, a new shim could be placed on the top of support 46 thereby restoring the original support area and thus provide a secure hold on top of support 46.

A secondary lock ensures that cam lock 61 does not work loose during shaking of the paint. The secondary lock comprises a spring 70, a steel sphere 71, and a spherical indentation 72 located in member 63. When member 63 is rotated downward spherical indentation 70 aligns with sphere 71 thereby creating a resistance to movement between member 63 and bracket 62. This ensures that cam lock 61 will not work loose during shaking of the paint. To release the secondary lock the operator grasps handle 61 and pushes it upward forcing the sphere inward against the spring 70, thus allowing member 63 to move freely upward.

OPERATION

An operator wishing to mix a latex paint pours the primary pigment paint colors into the white base paint and places the cover on the container. He then places the container or containers within holder 14 of the paint mixing apparatus 10. Although only one container is shown in the drawing, it is apparent that a number of containers can be mixed at one time within holder 14. With member 46 located in the position indicated by the solid lines in FIG. 3, the paint container can be easily placed in holder 14. Furthermore, because support 46 rotates about the edge of support 46, it supports the container without allowing it to fall through holder 14. After placing the container or containers within the paint holding device the operator rotates support 46 into the position shown by the dotted lines in FIG. 3. The operator then closes cam locks 60 and 61 on both ends of support 46 which securely fastens paint container 50 in holder 14. The operator then turns on a switch 79 which starts motor 12 thus powering driving assembly 13 through a first pulley 80 and a second pulley 81 connected together through a suitable belt 82.

Figure 5:
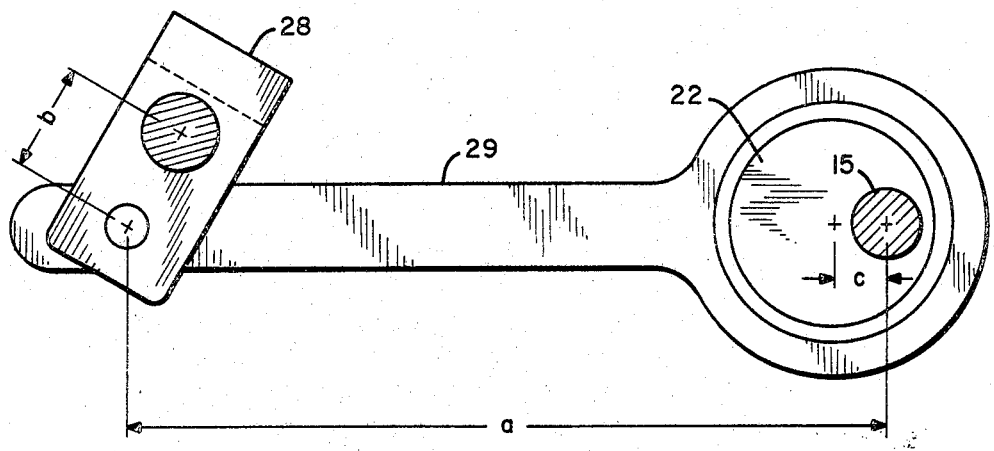
FIG. 5 is a partial cross-sectional view taken along line 5—5 of FIG. 2 showing the drive assembly.

In typical operations it has been found that two minutes is sufficient time to effectively mix a container of latex base paint with the drive assembly shaft 15 rotating at 450 revolutions per minute. A typical set of dimensions for the drive assembly that has produced good results in a distance (denoted by $a$ in FIG. 5) of 5¼ inches between center of shaft 15 and center of shaft 27, a one inch yoke arm (denoted by $b$ in FIG. 5), and a ⅜ inch offset of the center of eccentric 22 (denoted by $c$ in FIG. 5). These dimensions of the drive assembly produce oscillation about non-vertical axis 49 in which the angle of oscillation (denoted by $\theta$ in FIG. 4) does not exceed 45 degrees. The operator also aligns container holder 14 so that the angular deflection of container 50 past the vertical (denoted by $\alpha$ in FIG. 4) does not exceed 10 degrees at the maximum and preferably is approximately five degrees.

I claim:

1. In a mixing machine a holder for a cylindrical container comprising: a first and second member, one of said members adapted to support the container at a first peripheral region, said second member located parallel to said first member and adapted to support the container at a second peripheral region located on the opposite end and diagonally opposite from said first peripheral region.

2. The apparatus of claim 1 wherein said members have a cross-sectional area in the form of a right angle.

3. The apparatus of claim 2 wherein said members have a resilient material located on the base of said members to prevent sliding of the container.

4. The apparatus of claim 1 wherein one of said members is pivotally mounted for quickly removing the container.

5. The apparatus of claim 4 wherein a cam lock is provided for securing said pivotally mounted member.

6. The apparatus of claim 5 wherein a lock is provided for securing said cam lock.

7. The apparatus of claim 6 including oscillatory apparatus for oscillating the container about an axis approximately 15° from a vertical.

8. The apparatus of claim 7 wherein the angular rotation of the container does not exceed 45°.

References Cited

UNITED STATES PATENTS

| | | | |
|---|---|---|---|
| 2,022,527 | 11/1935 | Schletz | 259—56 |
| 2,735,663 | 2/1956 | Holt | 259—75 |
| 3,388,895 | 6/1968 | Ogren | 259—75 |
| 3,415,495 | 12/1968 | Grubelic | 259—72 |

ROBERT W. JENKINS, Primary Examiner

U.S. Cl. X.R.

259—56